United States Patent
Chen et al.

(10) Patent No.: US 12,517,783 B2
(45) Date of Patent: Jan. 6, 2026

(54) MEMORY WITH ELECTRICALLY PROGRAMMABLE FUSE BLOWN RESULT CORRECTING FUNCTION AND OPERATIONAL METHOD THEREOF

(71) Applicant: Etron Technology, Inc., Hsinchu (TW)

(72) Inventors: Ho-Yin Chen, Hsinchu County (TW); Ting-Feng Chang, Kaohsiung (TW); Bo-Han Zhang, Kaohsiung (TW)

(73) Assignee: Etron Technology, Inc., Hsinchu (TW)

( * ) Notice: Subject to any disclaimer, the term of this patent is extended or adjusted under 35 U.S.C. 154(b) by 0 days.

(21) Appl. No.: 18/623,024

(22) Filed: Mar. 31, 2024

(65) Prior Publication Data
US 2024/0330107 A1    Oct. 3, 2024

Related U.S. Application Data

(60) Provisional application No. 63/455,578, filed on Mar. 30, 2023.

(51) Int. Cl.
*G06F 11/10* (2006.01)
*G11C 29/56* (2006.01)

(52) U.S. Cl.
CPC .... *G06F 11/1004* (2013.01); *G11C 29/56008* (2013.01); *G11C 29/56016* (2013.01); *G11C 2029/5602* (2013.01)

(58) Field of Classification Search
CPC ........... G06F 11/1004; G11C 29/56008; G11C 29/56016; G11C 2029/5602; G11C 2029/4402; G11C 29/027
USPC ........................................................ 714/6.11
See application file for complete search history.

(56) References Cited

U.S. PATENT DOCUMENTS

| | | | |
|---|---|---|---|
| 12,266,415 B1 * | 4/2025 | Gorman | .............. G06F 11/1048 |
| 2008/0061817 A1 | 3/2008 | Erickson | |
| 2020/0210586 A1 | 7/2020 | Cariello | |

OTHER PUBLICATIONS

Costa et al., "Enabling ECC and Repair Features in an eFuse Box for Memory Repair Applications", IEEE 22nd International Symposium on Quality Electronic Design (Year: 2021).*

* cited by examiner

*Primary Examiner* — Yair Leibovich
(74) *Attorney, Agent, or Firm* — Winston Hsu (57) ABSTRACT

A memory includes a plurality of e-fuse sets, a sensing circuit, an Error-Correcting Code (ECC) circuit, and a plurality of registers. Each e-fuse set includes a plurality of e-fuses, and each e-fuse of the plurality of e-fuses corresponds to a first blown result. The sensing circuit senses the plurality of e-fuses to output a plurality of first blown results. The ECC circuit receives the plurality of first blown results and corrects a first blown result if the first blown result includes an error or directly outputs the first blown result if the first blown result comprises no error to generate a second blown result. The plurality of registers receive a plurality of second blown results. The plurality of second blown results adjusts predetermined settings of the memory, and a number of the plurality of registers is less than a number of the plurality of e-fuses.

13 Claims, 6 Drawing Sheets

MEMORY WITH ELECTRICALLY PROGRAMMABLE FUSE BLOWN RESULT CORRECTING FUNCTION AND OPERATIONAL METHOD THEREOF

CROSS REFERENCE TO RELATED APPLICATIONS

This application claims the benefit of U.S. Provisional Application No. 63/455,578, filed on Mar. 30, 2023. The content of the application is incorporated herein by reference.

BACKGROUND OF THE INVENTION

1. Field of the Invention

The present invention relates to a memory and an operational method thereof, and particularly to a memory that has electrically programmable fuse (e-fuse) blown result correcting function.

2. Description of the Prior Art

In the prior art, e-fuses of a memory can be used for adjusting predetermined settings of the memory. Specifically, when the memory is tested by a tester, the tester may blow partial e-fuses of the memory according to a test result. Therefore, the memory can operate according to blown results of the e-fuses, wherein before the memory operates, the memory first needs to be sensed for the blown results of the e-fuses. However, as scaling technology of the memory improves, sensing results corresponding to the blown results of the e-fuses may include more and more errors, that is, the sensing results are inconsistent with the blown results. For example, when a first e-fuse of the e-fuses is blown, a second e-fuse of the e-fuses next to the first e-fuse may be affected, resulting in the second e-fuse being sensed as blown even if the second e-fuse is not blown. Moreover, the blown results of the e-fuses may be affected by operations of the memory, and the errors may be increased as time goes by. Therefore, how to correct the blown results of the e-fuses becomes an important issue for a memory designer.

SUMMARY OF THE INVENTION

An embodiment of the present invention provides a memory with e-fuse blown result correcting function. The memory includes a plurality of e-fuse sets, a sensing circuit, an Error-Correcting Code (ECC) circuit, and a plurality of registers. Each e-fuse set of the plurality of e-fuse sets includes a plurality of e-fuses, and each e-fuse of the plurality of e-fuses corresponds to a first blown result. The sensing circuit is coupled to the plurality of e-fuse sets and senses the plurality of e-fuses to output a plurality of first blown results. The ECC circuit is coupled to the sensing circuit, and receives the plurality of first blown results. The ECC circuit corrects a first blown result if the first blown result comprises an error or directly outputs the first blown result if the first blown result comprises no error to generate a second blown result. The plurality of registers are coupled to the ECC circuit and receive a plurality of second blown results, wherein the plurality of second blown results are used for adjusting predetermined settings of the memory, and a number of the plurality of registers is less than a number of the plurality of e-fuses.

According to one aspect of the invention, the first blown result at least comprises blown result corresponding to a normal e-fuse subset, and the ECC circuit corrects the blown result corresponding to the normal e-fuse subset to generate the second blown result if the blown result comprises the error.

According to one aspect of the invention, a number of the plurality of second blown results is less than a number of the plurality of first blown results, and the plurality of second blown results do not comprise the blown results corresponding to the parity e-fuse subset.

According to one aspect of the invention, the sensing circuit senses the plurality of e-fuses according to resistances of the plurality of e-fuses or currents flowing through the plurality of e-fuses.

According to one aspect of the invention, the sensing circuit senses the plurality of e-fuses when the memory is powered up or reset.

According to one aspect of the invention, the memory further includes a multiplexing circuit coupled between the ECC circuit and the sensing circuit, wherein the sensing circuit utilizes the multiplexing circuit to output first blown results of the plurality of e-fuse sets in turn.

According to one aspect of the invention, the memory further includes a counting circuit coupled to the sensing circuit, wherein the sensing circuit utilizes the counting circuit to record outputting statuses of the first blown results of the plurality of e-fuse sets.

According to one aspect of the invention, the predetermined settings correspond to at least one of activations of partial memory cells of the memory, internal operation voltages of the memory, and operational timings of the memory.

Another embodiment of the present invention provides a memory with e-fuse blown result correcting function. The correcting circuit receives and optionally corrects a plurality of first blown results to generate a plurality of second blown results, wherein the plurality of first blown results correspond to the memory, and the plurality of second blown results are used for adjusting predetermined settings of the memory.

According to one aspect of the invention, the memory further includes a plurality of e-fuse sets coupled to the correcting circuit, wherein the plurality of first blown results are comprised in one e-fuse set of the plurality of e-fuse sets.

According to one aspect of the invention, the memory further includes a plurality of registers coupled to the correcting circuit, receiving the plurality of second blown results, wherein a number of the plurality of registers is less than a number of the plurality of e-fuses.

According to one aspect of the invention, the predetermined settings correspond to at least one of activations of partial memory cells of the memory, internal operation voltages of the memory, and operational timings of the memory.

Another embodiment of the present invention provides an operational method of a memory with e-fuse blown result correcting function, wherein the memory includes a plurality of e-fuse sets, a sensing circuit, an Error-Correcting Code (ECC) circuit and a plurality of registers. The operational method includes sensing the plurality of e-fuses to output a plurality of first blown results by the sensing circuit; receiving the plurality of first blown results and generating a plurality of second blown results according to the plurality of first blown results by the ECC circuit, wherein the ECC circuit corrects a first blown result if the first blown result comprises an error or directly outputs the first blown result if the first blown result comprises no error to generate a second blown result; and receiving a plurality of second blown results by the plurality of registers, wherein the plurality of second blown results are used for adjusting predetermined settings of the memory, and a number of the plurality of registers is less than a number of the plurality of e-fuses.

A memory with e-fuse blown result correcting function provided by the present invention utilizes a sensing circuit to sense each e-fuse set of a plurality of e-fuse sets of the memory to output a plurality of first blown results corresponding to each e-fuse set, and utilizes an ECC circuit to optionally correct a plurality of first blown results corresponding to a normal e-fuse subset included in the plurality of first blown results according to blown results corresponding to a parity e-fuse subset included in the plurality of first blown results and generate a plurality of second blown results corresponding to the normal e-fuse subset, wherein the plurality of second blown results adjusting predetermined settings of the memory. Therefore, compared to the prior art, because the present invention can correct errors of a plurality of first blown results of the plurality of e-fuse sets of the memory, a reliability of the memory can be increased.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
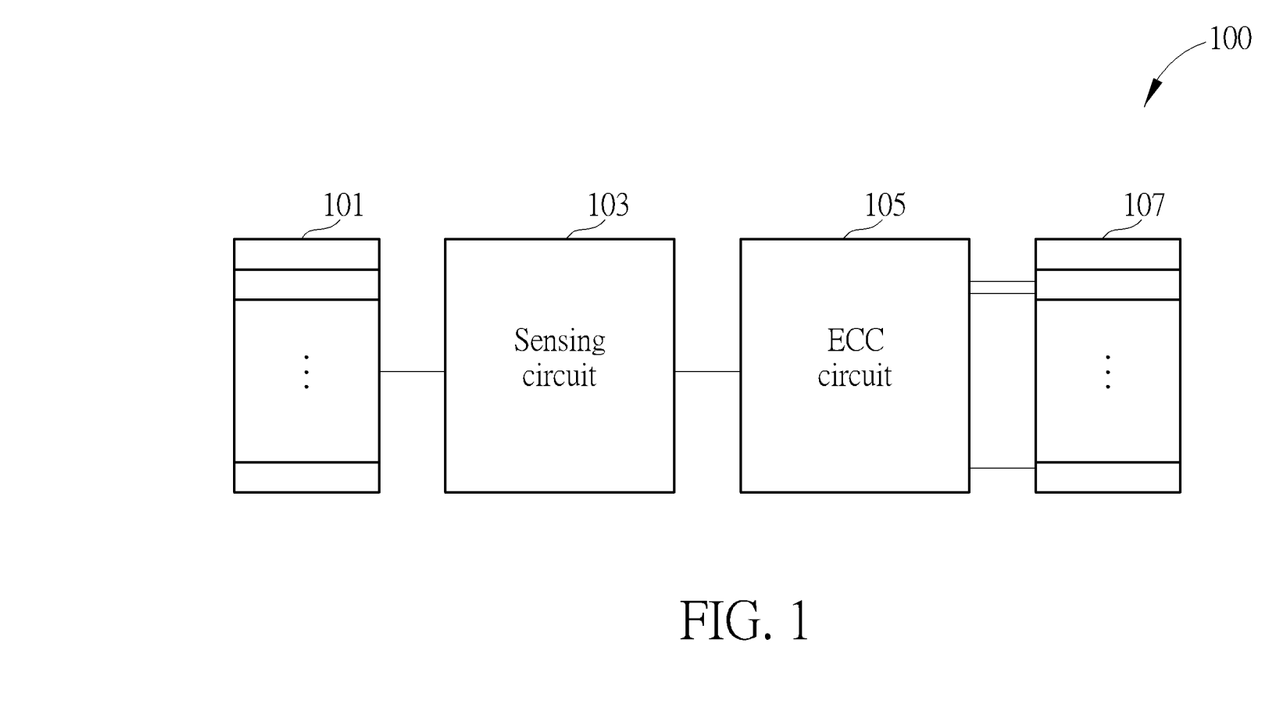
FIG. 1 is a diagram illustrating a memory with electrically programmable fuse (e-fuse) correcting function according to a first embodiment of the present invention.

Please refer to FIG. 1. FIG. 1 is a diagram illustrating a memory 100 with electrically programmable fuse (e-fuse) blown result correcting function according to a first embodiment of the present invention. As shown in FIG. 1, the memory 100 includes a plurality of e-fuse sets 101, a sensing circuit 103, an Error-Correcting Code (ECC) circuit 105, and a plurality of registers 107, wherein the sensing circuit 103 is coupled to the plurality of e-fuse sets 101, the ECC circuit 105 is coupled to the sensing circuit 103, and the plurality of registers 107 are coupled to the ECC circuit 105.

Figure 2:
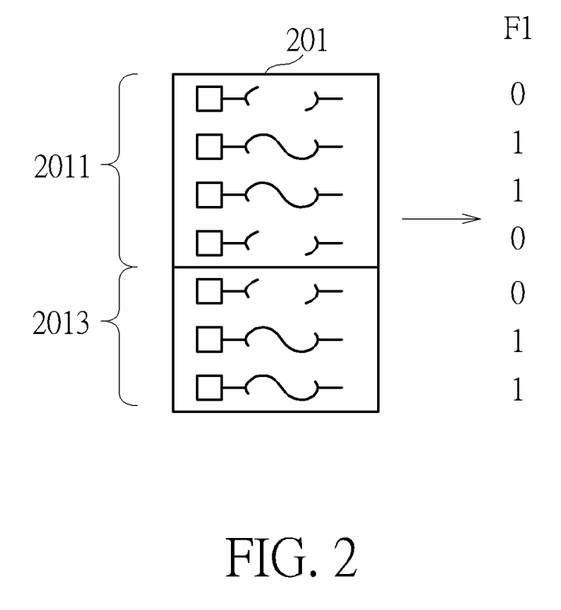
FIG. 2 is a diagram illustrating the sensing circuit sensing an e-fuse set and outputting a plurality of first blown results corresponding to the e-fuse set.

The sensing circuit 103 is used for sensing each e-fuse set of the plurality of e-fuse sets 101 and outputting a plurality of first blown results corresponding to the each e-fuse set of the plurality of e-fuse sets 101, wherein the each e-fuse set includes a plurality of e-fuses. Please refer to FIG. 2. FIG. 2 is a diagram illustrating the sensing circuit 103 sensing an e-fuse set 201 and outputting a plurality of first blown results corresponding to the e-fuse set 201, wherein the e-fuse set 201 is included in the plurality of e-fuse sets 101, and the plurality of e-fuse sets 101 are not shown in FIG. 2 for simplicity. As shown in FIG. 2, the e-fuse set 201 includes a normal e-fuse subset 2011 and a parity e-fuse subset 2013, wherein the normal e-fuse subset 2011 includes 4 normal e-fuses, and the parity e-fuse subset 2013 includes 3 parity e-fuses. However, the present invention is not limited to the normal e-fuse subset 2011 including the 4 normal e-fuses and the parity e-fuse subset 2013 including the 3 parity e-fuses. That is, the normal e-fuse subset 2011 can include a plurality of normal e-fuses and the parity e-fuse subset 2013 can include a plurality of parity e-fuses, wherein a number of the plurality of parity e-fuses is determined according to a number of the plurality of normal e-fuses. In addition, determining the number of the plurality of parity e-fuses according to the number the plurality of normal e-fuses is well-known to those of ordinary skill in the art, so further description thereof is omitted for simplicity.

As shown in FIG. 2, for example, a first normal e-fuse and a fourth normal e-fuse of the normal e-fuse subset 2011 should be blown; a second normal e-fuse and a third normal e-fuse of the normal e-fuse subset 2011 should not be blown; a first parity e-fuse of the parity e-fuse subset 2013 should be blown; and a second parity e-fuse and a third parity e-fuse of the parity e-fuse subset 2013 should not be blown. When the memory 100 is powered up or reset, the sensing circuit 103 (not shown in FIG. 2) senses the e-fuse set 201 to generate the plurality of first blown results corresponding to the e-fuse set 201. For example, because the first normal e-fuse is blown, the sensing circuit 103 should sense the first normal e-fuse to generate a blown result "0", because the second normal e-fuse is not blown, the sensing circuit 103 should sense the second normal e-fuse to generate a blown result "1", and so on. Therefore, the sensing circuit 103 should sense the normal e-fuse subset 2011 and the parity e-fuse subset 2013 to generate the plurality of first blown results (i.e. first blown results F1 (0, 1, 1, 0, 0, 1, 1)) corresponding to the e-fuse set 201. In addition, in another embodiment of the present invention, the sensing circuit 103 can sense a blown e-fuse to generate the blown result "1" and sense a non-blown e-fuse to generate the blown result "0". In addition, in one embodiment of the present invention, the sensing circuit 103 senses the e-fuse set 201 according to resistances of e-fuses of the e-fuse set 201 or currents flowing through the e-fuses of the e-fuse set 201 to generate the first blown results F1 (0, 1, 1, 0, 0, 1, 1). But, the present invention is not limited to the sensing circuit 103 sensing the e-fuse set 201 according to the resistances of the e-fuses or the currents flowing through the e-fuses to generate the first blown results F1 (0, 1, 1, 0, 0, 1, 1), that is, the sensing circuit 103 can sense the e-fuse set 201 according to other parameters of the e-fuses of the e-fuse set 201 to generate the first blown results F1 (0, 1, 1, 0, 0, 1, 1).

Figure 3:
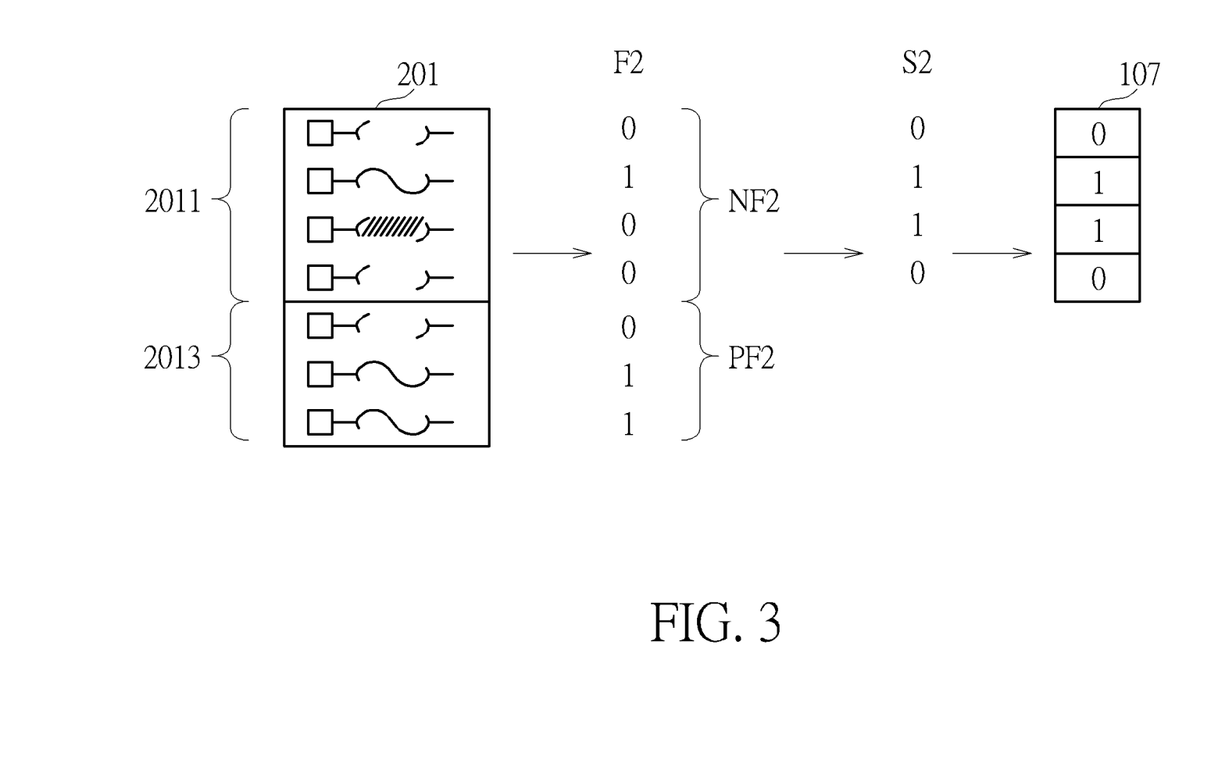
FIG. 3 is a diagram illustrating operation of the ECC circuit when an error appears in the plurality of first blown results corresponding to the e-fuse set according to one embodiment of the present invention.

Please refer to FIG. 3. FIG. 3 is a diagram illustrating operation of the ECC circuit 105 when an error appears in the plurality of first blown results corresponding to the e-fuse set 201 according to one embodiment of the present invention. After the ECC circuit 105 receives the plurality of first blown results corresponding to the e-fuse set 201 from the sensing circuit 103, if the plurality of first blown results corresponding to the e-fuse set 201 include the error, the ECC circuit 105 can determine whether the error appears in the normal e-fuse subset 2011, wherein the ECC circuit 105 determining whether the error appears in the normal e-fuse subset 2011 is well-known to those of ordinary skilled in the art, so further description thereof is omitted for simplicity. As shown in FIG. 3, for example, if the ECC circuit 105 receives first blown results F2 (0, 1, 0, 0, 0, 1, 1) corresponding to the e-fuse set 201, wherein the first blown results F2 (0, 1, 0, 0, 0, 1, 1) include first blown results NF2 (0, 1, 0, 0) and first blown results PF2 (0, 1, 1), the first blown results NF2 (0, 1, 0, 0) corresponds to the normal e-fuse subset 2011, and the first blown results PF2 (0, 1, 1) corresponds to the parity e-fuse subset 2013, the ECC circuit 105 can determine that a first blown result "0" corresponding to the third normal e-fuse (marked in slashed lines) shown in the first blown results NF2 (0, 1, 0, 0) is wrong, and can correct the first blown result "0" corresponding to the third normal e-fuse from "0" to "1". In other words, the ECC circuit 105 can correct the first blown results NF2 (0, 1, 0, 0) according to the first blown results PF2 (0, 1, 1) to generate a plurality of second blown results (i.e. second blown results S2 (0, 1, 1, 0)), wherein the second blown results S2 (0, 1, 1, 0) corresponds to the normal e-fuse subset 2011. In addition, because the first blown results PF2 (0, 1, 1) are used for correcting the first blown results NF2 (0, 1, 0, 0), the second blown results S2 (0, 1, 1, 0) do not need to include the first blown results PF2 (0, 1, 1). Therefore, a number of the second blown results S2 (0, 1, 1, 0) is less than a number of the first blown results F2 (0, 1, 0, 0, 0, 1, 1).

In addition, after the ECC circuit 105 generates the second blown results S2 (0, 1, 1, 0), the ECC circuit 105 can output and store the second blown results S2 (0, 1, 1, 0) in the plurality of registers 107, wherein each second blown result of the second blown results S2 (0, 1, 1, 0) is stored in a corresponding register of the plurality of registers 107. Because the second blown results S2 (0, 1, 1, 0) do not include the first blown results PF2 (0, 1, 1), a number of the plurality of registers 107 is less than a number of the e-fuses of the e-fuse set 201. In addition, the second blown results S2 (0, 1, 1, 0) stored in the plurality of registers 107 are used for adjusting predetermined settings of the memory 100, and the predetermined settings can include at least one of activations of partial memory cells of the memory 100, internal operation voltages of the memory 100, and operational timings of the memory 100. But, the present invention is not limited to the predetermined settings including the at least one of activations of the partial memory cells, the internal operation voltages, and the operational timings. That is, the second blown results S2 (0, 1, 1, 0) can be used for adjusting other settings of the memory 100 different from the predetermined settings.

Figure 4:
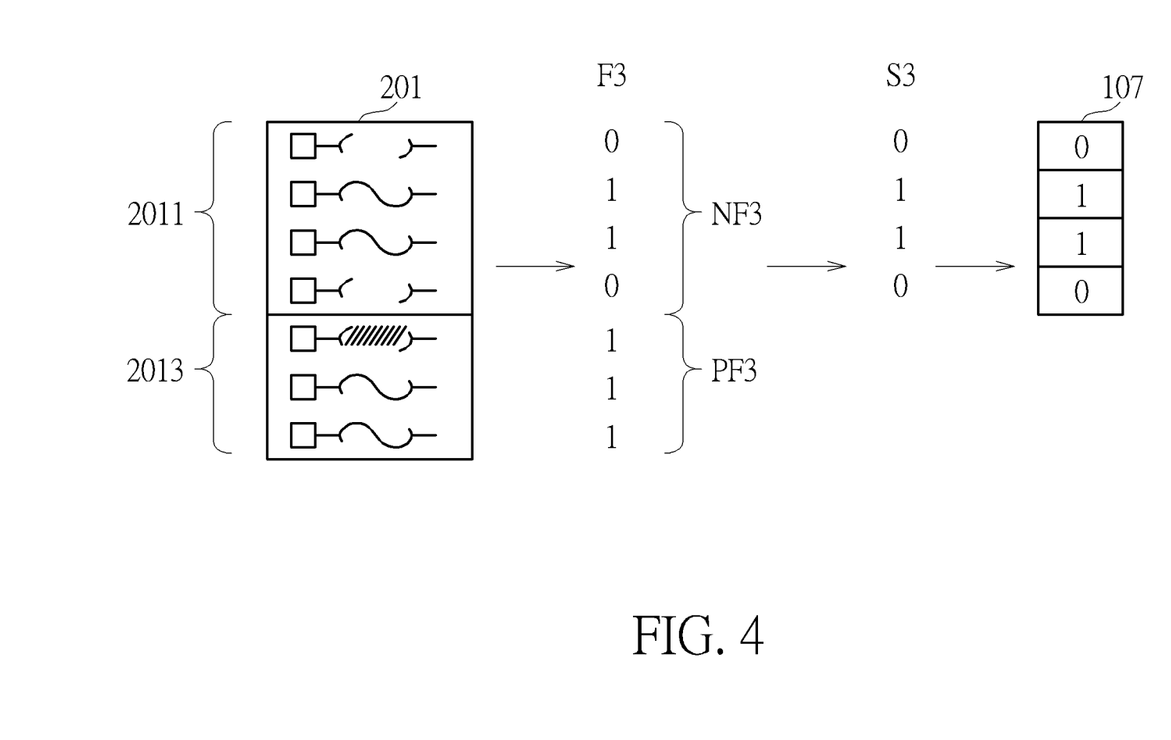
FIG. 4 is a diagram illustrating operation of the ECC circuit when an error appears in the plurality of first blown results corresponding to the e-fuse set according to another embodiment of the present invention.

Please refer to FIG. 4. FIG. 4 is a diagram illustrating operation of the ECC circuit 105 when an error appears in the plurality of first blown results corresponding to the e-fuse set 201 according to another embodiment of the present invention. As shown in FIG. 4, for example, if the ECC circuit 105 receives first blown results F3 (0, 1, 1, 0, 1, 1, 1), wherein the first blown results F3 (0, 1, 1, 0, 1, 1, 1) includes first blown results NF3 (0, 1, 1, 0) and first blown results PF3 (1, 1, 1), the first blown results NF3 (0, 1, 1, 0) corresponds to the normal e-fuse subset 2011, and the first blown results PF3 (1, 1, 1) corresponds to the parity e-fuse subset 2013, the ECC circuit 105 can determine that a first blown result "1" corresponding to the first parity e-fuse (marked in slashed lines) shown in the first blown results F3 is wrong. Because the error appears in the parity e-fuse subset 2013, rather than in the normal e-fuse subset 2011, the ECC circuit 105 does not correct the first blown result "1" corresponding to the first parity e-fuse. That is, the ECC circuit 105 directly takes first blown results NF3 (0, 1, 1, 0) as second blown results S3 (0, 1, 1, 0) and outputs the second blown results S3 (0, 1, 1, 0) to the plurality of registers 107. In addition, subsequent operation corresponding to the second blown results S3 (0, 1, 1, 0) are similar to the above-mentioned operation corresponding to the second blown results S2 (0, 1, 1, 0), so further description thereof is omitted for simplicity.

In addition, when the plurality of first blown results corresponding to the e-fuse set 201 includes at least two errors, the ECC circuit 105 cannot correct the at least two errors (or the ECC circuit 105 may correct a first blown result of the plurality of first blown results unrelated to the at least two errors). However, because probability of the plurality of first blown results corresponding to the e-fuse set 201 including the at least two errors is very small, the plurality of first blown results corresponding to the e-fuse set 201 including the at least two errors can be neglected. Therefore, the ECC circuit 105 can apply to most situations of the plurality of first blown results corresponding to the e-fuse set 201.

In another embodiment of the present invention, the memory 100 further includes a multiplexing circuit coupled between the sensing circuit 103 and the ECC circuit 105. The sensing circuit 103 can utilize the multiplexing circuit to output first blown results corresponding to the plurality of e-fuse sets 101 to the ECC circuit 105 in turn. For example, as shown in FIG. 3, the sensing circuit 103 can utilize the multiplexing circuit to output the first blown results F2 (0, 1, 0, 0, 0, 1, 1) to the ECC circuit 105 at a first time. Then, the sensing circuit 103 can utilize the multiplexing circuit to output first blown results corresponding to an e-fuse set next to the e-fuse set 201 to the ECC circuit 105 at a second time, wherein subsequent operation corresponding to the first blown results corresponding to the e-fuse set next to the e-fuse set 201 is similar to the above-mentioned operation corresponding to the first blown results F2 (0, 1, 0, 0, 0, 1, 1), so further description thereof is omitted for simplicity.

In addition, in another embodiment of the present invention, the memory 100 further includes a counting circuit, wherein the counting circuit is coupled to the sensing circuit 103. The sensing circuit 103 utilizes the counting circuit to record outputting statuses of the first blown results corresponding to the plurality of e-fuse sets 101. Therefore, the sensing circuit 103 can sense the e-fuse set next to the e-fuse set 201 and output the first blown results corresponding to the e-fuse set next to the e-fuse set 201 according to the outputting statuses.

In addition, one of ordinary skill in the art should clearly realize functions of the plurality of e-fuse sets 101, the sensing circuit 103, the ECC circuit 105, the plurality of registers 107, the multiplexing circuit, and the counting circuit through the above-mentioned corresponding descriptions of the plurality of e-fuse sets 101, the sensing circuit 103, the ECC circuit 105, the plurality of registers 107, the multiplexing circuit, and the counting circuit, so one of ordinary skill in the art can easily implement the plurality of e-fuse sets 101, the sensing circuit 103, the ECC circuit 105, the plurality of registers 107, the multiplexing circuit, and the counting circuit through field programmable gate arrays (FPGAs) with the above-mentioned functions of the plurality of e-fuse sets 101, the sensing circuit 103, the ECC circuit 105, the plurality of registers 107, the multiplexing circuit, and the counting circuit respectively, or application-specific integrated circuits (ASICs) with the above-mentioned functions of the plurality of e-fuse sets 101, the sensing circuit 103, the ECC circuit 105, the plurality of registers 107, the multiplexing circuit, and the counting circuit respectively, or software modules with the above-mentioned functions of the plurality of e-fuse sets 101, the sensing circuit 103, the ECC circuit 105, the plurality of registers 107, the multiplexing circuit, and the counting circuit respectively, or an analog integrated circuits with the above-mentioned functions of the plurality of e-fuse sets 101, the sensing circuit 103, the ECC circuit 105, the plurality of registers 107, the multiplexing circuit, and the counting circuit respectively. Moreover, because one of ordinary skill in the art can input codes of the above mentioned functions of the plurality of e-fuse sets 101, the sensing circuit 103, the ECC circuit 105, the plurality of registers 107, the multiplexing circuit, and the counting circuit to the FPGAs, or utilize intellectual property cores (IPs) of the above mentioned functions of the plurality of e-fuse sets 101, the sensing circuit 103, the ECC circuit 105, the plurality of registers 107, the multiplexing circuit, and the counting circuit to implement the ASICS, and the FPGAs and the IPs are obviously ready-made to one of ordinary skill in the art, further descriptions of corresponding structures of the plurality of e-fuse sets 101, the sensing circuit 103, the ECC circuit 105, the plurality of registers 107, the multiplexing circuit, and the counting circuit are omitted for simplicity.

Figure 5:
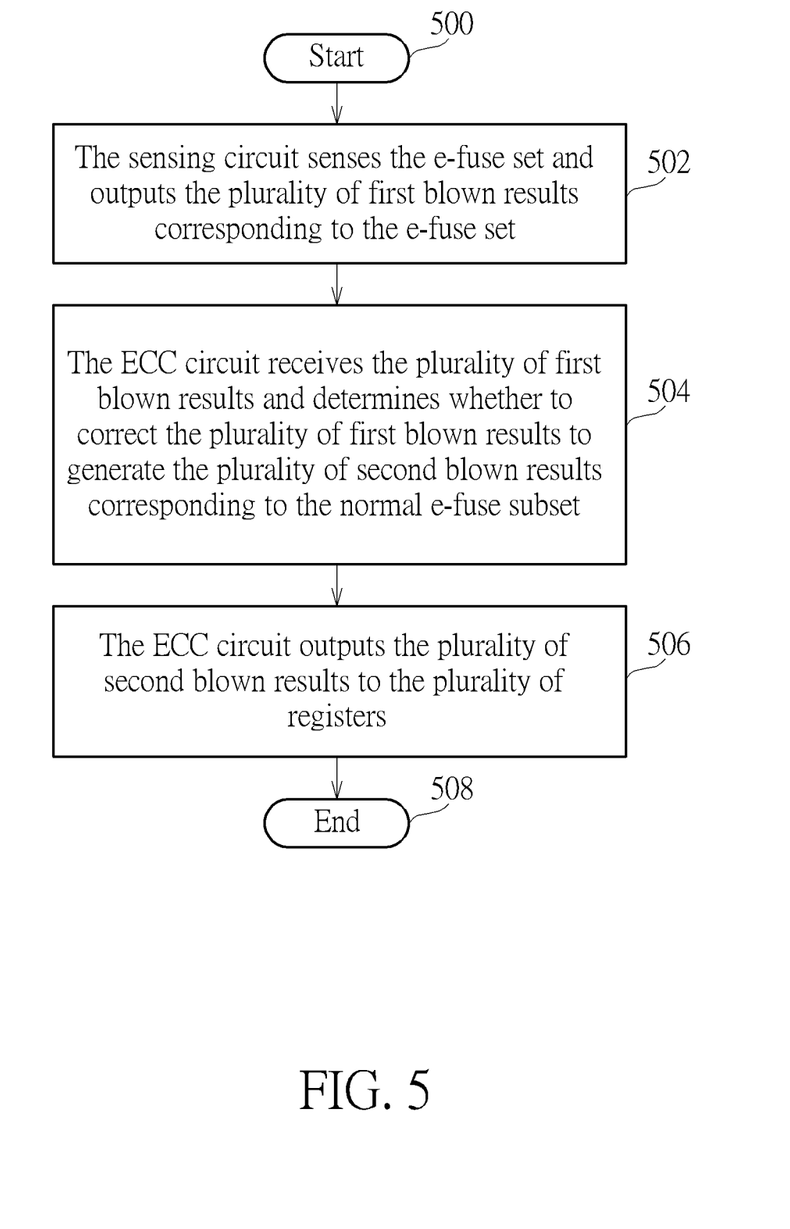
FIG. 5 is a flowchart illustrating an operational method of correcting the plurality of first blown results corresponding to the e-fuse set according to a second embodiment of the present invention.

Please refer to FIG. 5. FIG. 5 is a flowchart illustrating an operational method of correcting the plurality of first blown results corresponding to the e-fuse set 201 according to a second embodiment of the present invention. The operational method in FIG. 5 is illustrated using FIGS. 3, 4. Detailed steps are as follows:

Step 500: Start.

Step 502: The sensing circuit 103 senses the e-fuse set 201 and outputs the plurality of first blown results corresponding to the e-fuse set 201.

Step 504: The ECC circuit 105 receives the plurality of first blown results corresponding to the e-fuse set 201 and determines whether to correct the plurality of first blown results corresponding to the e-fuse set 201 to generate the plurality of second blown results corresponding to the normal e-fuse subset 2011.

Step 506: The ECC circuit 105 outputs the plurality of second blown results corresponding to the normal e-fuse subset 2011 to the plurality of registers 107.

Step 508: End.

In Step 502, taking FIG. 3 as an example, the sensing circuit 103 can sense the e-fuse set 201 and output the first blown results F2 (0, 1, 0, 0, 0, 1, 1). In step 504, the ECC circuit 105 can receive the first blown results F2 (0, 1, 0, 0, 0, 1, 1) and determine that the first blown result "0" corresponding to the third normal e-fuse is wrong. Then, the ECC circuit 105 can correct the first blown results NF2 (0, 1, 0, 0) according to the first blown results PF2 (0, 1, 1) to generate the second blown results S2 (0, 1, 1, 0). In step 506, the ECC circuit 105 can store the each second blown result of the second blown results S2 (0, 1, 1, 0) to the corresponding register of the plurality of registers 107. However, taking FIG. 4 as another example, in Step 504, the ECC circuit 105 receives the first blown results F3 (0, 1, 1, 0, 1, 1, 1) and determines that the first blown result "1" corresponding to the first parity e-fuse is wrong. Then, the ECC circuit 105 directly takes the first blown results NF3 (0, 1, 1, 0) as the second blown results S3 (0, 1, 1, 0) and outputs the second blown results S3 (0, 1, 1, 0) to the plurality of registers 107.

Figure 6:
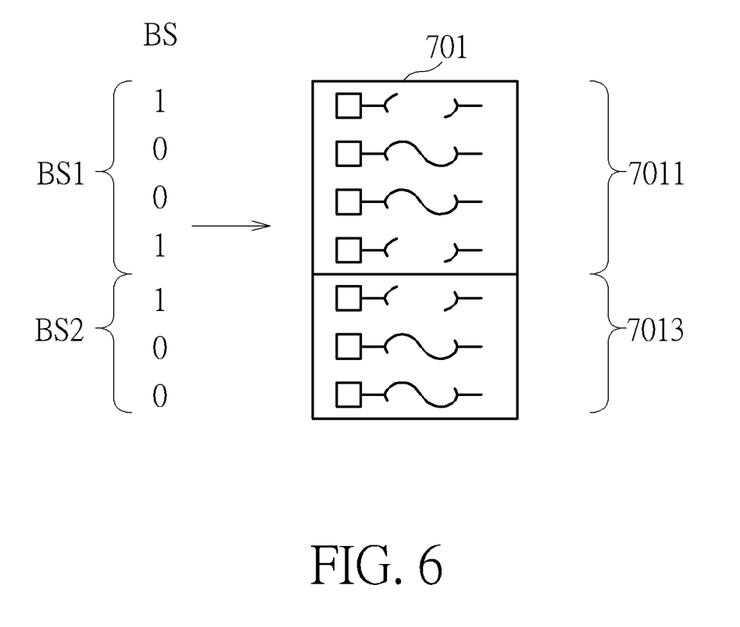
FIG. 6 is a diagram illustrating the plurality of e-fuses of the each e-fuse set of the memory being blown according to blowing signals generated by a tester according to a third embodiment of the present invention.

Please refer to FIG. 6. FIG. 6 is a diagram illustrating the plurality of e-fuses of the each e-fuse set of the memory 100 being blown according to blowing signals BS generated by a tester according to a third embodiment of the present invention. As shown in FIG. 6, for example, the blowing signals BS includes a first blowing signal BS1 (1, 0, 0, 1) and second blowing signal BS2 (1, 0, 0), wherein the tester first generates the first blowing signal BS1 (1, 0, 0, 1), and then utilizes the first blowing signal BS1 (1, 0, 0, 1) to generates the second blowing signal BS2 (1, 0, 0). In addition, the first blowing signal BS1 (1, 0, 0, 1) corresponds to an e-fuse set 701 of the plurality of e-fuse sets 101, and the e-fuse set 701 includes a normal e-fuse subset 7011 and a parity e-fuse subset 7013. As shown in FIG. 6, the tester utilizes the first blowing signal BS1 (1, 0, 0, 1) to blow a first normal e-fuse and a fourth normal e-fuse of the normal e-fuse subset 7011 and not to blow a second normal e-fuse and a third normal e-fuse of the normal e-fuse subset 7011. Similarly, the tester utilizes the second blowing signal BS2 (1, 0, 0) to blow a first parity e-fuse of the parity e-fuse subset 7013 and not to blow a second parity e-fuse and a third parity e-fuse of the parity e-fuse subset 7013. Therefore, the first normal e-fuse, the fourth normal e-fuse, and the first parity e-fuse can be blown according to the blowing signal BS.

Therefore, because the blowing signal BS not only corresponds to the normal e-fuse subset 7011 but also corresponds to the parity e-fuse subset 7013, when the e-fuse set 701 is sensed by the sensing circuit 103 later, subsequent operation corresponding to the e-fuse set 701 can be referred to above-mentioned descriptions corresponding to FIGS. 2-4, so further description thereof is omitted for simplicity.

To sum up, the memory with e-fuse blown result correcting function provided by the present invention utilizes the sensing circuit to sense the each e-fuse set of the plurality of e-fuse sets of the memory to output the plurality of first blown results corresponding to the each e-fuse set, and utilizes the ECC circuit optionally to correct the plurality of first blown results corresponding to the normal e-fuse subset according to the blown results corresponding to the parity e-fuse subset and generate the plurality of second blown results corresponding to the normal e-fuse subset, wherein the plurality of second blown results are used for adjusting the predetermined settings of the memory. Therefore, compared to the prior art, because the present invention can correct errors of a plurality of first blown results of the plurality of e-fuse sets of the memory, a reliability of the memory can be increased.

Although the present invention has been illustrated and described with reference to the embodiments, it is to be understood that the invention is not to be limited to the disclosed embodiments, but on the contrary, is intended to cover various modifications and equivalent arrangements included within the spirit and scope of the appended claims.

What is claimed is:

1. A memory with electrically programmable fuse (e-fuse) blown result correcting function, comprising:
a plurality of e-fuse sets, wherein each e-fuse set of the plurality of e-fuse sets comprises a plurality of e-fuses, and each e-fuse of the plurality of e-fuses corresponds to a first blown result;
a sensing circuit coupled to the plurality of e-fuse sets, sensing the plurality of e-fuses to output a plurality of first blown results;

an Error-Correcting Code (ECC) circuit coupled to the sensing circuit and receiving the plurality of first blown results, wherein the ECC circuit corrects the first blown result if the first blown result comprises an error or directly outputs the first blown result if the first blown result comprises no error to generate a second blown result; and a plurality of registers coupled to the ECC circuit, receiving a plurality of second blown results, wherein the plurality of second blown results are used for adjusting predetermined settings of the memory, and a number of the plurality of registers is less than a number of the plurality of e-fuses.

2. The memory of claim 1, wherein the first blown result at least comprises a blown result corresponding to a normal e-fuse subset, and the ECC circuit corrects the blown result corresponding to the normal e-fuse subset to generate the second blown result if the blown result comprises the error.

3. The memory of claim 2, wherein a number of the plurality of second blown results is less than a number of the plurality of first blown results, and the plurality of second blown results do not comprise the blown results corresponding to a parity e-fuse subset.

4. The memory of claim 1, wherein the sensing circuit senses the plurality of e-fuses according to resistances of the plurality of e-fuses or currents flowing through the plurality of e-fuses.

5. The memory of claim 1, wherein the sensing circuit senses the plurality of e-fuses when the memory is powered up or reset.

6. The memory of claim 1, further comprising:
a multiplexing circuit coupled between the ECC circuit and the sensing circuit, wherein the sensing circuit utilizes the multiplexing circuit to output first blown results of the plurality of e-fuse sets in turn.

7. The memory of claim 6, further comprising:
a counting circuit coupled to the sensing circuit, wherein the sensing circuit utilizes the counting circuit to record outputting statuses of the first blown results of the plurality of e-fuse sets.

8. The memory of claim 1, wherein the predetermined settings correspond to at least one of activations of partial memory cells of the memory, internal operation voltages of the memory, and operational timings of the memory.

9. A memory with e-fuse blown result correcting function, comprising:
a correcting circuit receiving and optionally correcting a plurality of first blown results to generate a plurality of second blown results, wherein the plurality of first blown results correspond to the memory, and the plurality of second blown results are used for adjusting predetermined settings of the memory.

10. The memory of claim 9, further comprising:
a plurality of e-fuse sets coupled to the correcting circuit, wherein the plurality of first blown results are comprised in one e-fuse set of the plurality of e-fuse sets.

11. The memory of claim 10, further comprising:
a plurality of registers coupled to the correcting circuit, receiving the plurality of second blown results, wherein a number of the plurality of registers is less than a number of a plurality of e-fuses.

12. The memory of claim 9, wherein the predetermined settings correspond to at least one of activations of partial memory cells of the memory, internal operation voltages of the memory, and operational timings of the memory.

13. An operational method of a memory with e-fuse blown result correcting function, wherein the memory comprises a plurality of e-fuse sets, a sensing circuit, an Error-Correcting Code (ECC) circuit and a plurality of registers, comprising:
sensing a plurality of e-fuses to output a plurality of first blown results by the sensing circuit;
receiving the plurality of first blown results and generating a plurality of second blown results according to the plurality of first blown results by the ECC circuit, wherein the ECC circuit corrects a first blown result if the first blown result comprises an error or directly outputs the first blown result if the first blown result comprises no error to generate a second blown result; and
receiving the plurality of second blown results by the plurality of registers, wherein the plurality of second blown results are used for adjusting predetermined settings of the memory, and a number of the plurality of registers is less than a number of the plurality of e-fuses.

* * * * *